United States Patent
Moroga et al.

(10) Patent No.: US 11,108,611 B2
(45) Date of Patent: Aug. 31, 2021

(54) USER TERMINAL AND RADIO COMMUNICATION METHOD

(71) Applicant: NTT DOCOMO, INC., Tokyo (JP)

(72) Inventors: Hideyuki Moroga, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,340

(22) PCT Filed: Feb. 1, 2018

(86) PCT No.: PCT/JP2018/003360
§ 371 (c)(1),
(2) Date: Jul. 31, 2019

(87) PCT Pub. No.: WO2018/143325
PCT Pub. Date: Aug. 9, 2018

(65) Prior Publication Data
US 2020/0052940 A1 Feb. 13, 2020

(30) Foreign Application Priority Data
Feb. 3, 2017 (JP) .............................. JP2017-019122

(51) Int. Cl.
*H04L 27/26* (2006.01)
(52) U.S. Cl.
CPC .................. *H04L 27/265* (2013.01)
(58) Field of Classification Search
CPC ........... H04W 72/0446; H04W 72/042; H04W 24/08; H04W 72/0453; H04W 72/048; H04B 7/0456; H04L 5/0053; H04L 27/265
See application file for complete search history.

(56) References Cited

U.S. PATENT DOCUMENTS

| 2012/0071153 A1* | 3/2012 | Balachandran ........ H04J 11/004 455/422.1 |
| 2015/0117354 A1* | 4/2015 | Dai ...................... H04L 5/0053 370/329 |
| 2017/0257864 A1* | 9/2017 | Kakishima ........... H04B 7/0689 |

FOREIGN PATENT DOCUMENTS

JP      2009-526500 A      7/2009

OTHER PUBLICATIONS

3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," Jun. 2016 (310 pages).

(Continued)

*Primary Examiner* — Janice N Tieu
(74) *Attorney, Agent, or Firm* — Osha Bergman Watanabe & Burton LLP (57) ABSTRACT

In user terminal 20, reception section 204 receives one or more downlink signals mapped to a plurality of signal transmission points in a single carrier, and extraction section 214 extracts at least one of the one or more downlink signals that is assigned to at least one of the signal transmission points that belongs to a resource block group associated with user terminal 20, in which the resource block group is in units of a predetermined number of signal transmission points and the at least one of the one or more downlink signals is extracted based on a definition of the resource block group. This processing makes it possible to multiplex downlink signals for a plurality of terminals in a single-carrier transmission.

7 Claims, 9 Drawing Sheets

(56) References Cited

OTHER PUBLICATIONS

International Search Report for corresponding International Application No. PCT/JP2018/003360, dated Apr. 10, 2018 (3 pages).
Written Opinion for corresponding International Application No. PCT/JP2018/003360, dated Apr. 10, 2018 (4 pages).

* cited by examiner

USER TERMINAL AND RADIO COMMUNICATION METHOD

TECHNICAL FIELD

The present invention relates to a user terminal and a radio communication method in a next-generation mobile communication system.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT)), and the like.

Utilizing a high frequency band of 40 GHz or more as a radio frequency has been studied for the future radio communication system. Utilizing, as transmission waveforms in the downlink in high frequency bands, Orthogonal Frequency Division Multiplexing (OFDM); DFT spread OFDM (DFT-s-OFDM) that achieves signal waveform generation by spreading based on Discrete Fourier Transform (DFT); and the like has also been studied for the future radio communication system. In this case, low PAPR can be achieved by utilizing a single carrier or DFT-s-OFDM.

CITATION LIST

Non-Patent Literature
NPL 1
3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

SUMMARY OF INVENTION

Technical Problem

However, transmission is made using the entire bandwidth in the case of a single carrier such as in the case of DFT-s-OFDM or the like, so that the number of terminals capable of being used by multiplexing in a Transmission Time Interval (TTI), which is the minimum unit of scheduling, is less than in the case of OFDM.

In one aspect of the present invention, a new configuration is provided in which downlink signals for a plurality of terminals can be multiplexed in a downlink transmission in the future radio communication system.

Solution to Problem

A user terminal according to one aspect of the present invention includes: a reception section configured to receive one or more downlink signals mapped to a plurality of signal transmission points in a single carrier; and an extraction section configured to extract at least one of the one or more downlink signals that is assigned to at least one of the plurality of signal transmission points that belongs to a resource block group associated with the user terminal, the resource block group being in units of a predetermined number of signal transmission points, the at least one of the one or more downlink signals being extracted based on a definition of the resource block group.

A radio communication method according to one aspect of the present invention includes: receiving one or more downlink signals mapped to a plurality of signal transmission points in a single carrier; and extracting at least one of the one or more downlink signals that is assigned to at least one of the plurality of signal transmission points that belongs to a resource block group associated with a user terminal having received the one or more downlink signals, the resource block group being in units of a predetermined number of signal transmission points, the at least one of the one or more downlink signals being extracted based on a definition of the resource block group.

Advantageous Effects of Invention

In one aspect of the present invention, a new configuration is provided in which downlink signals for a plurality of terminals can be multiplexed in a downlink transmission in the future radio communication system.

DESCRIPTION OF EMBODIMENTS

Hereinafter, an embodiment of the present invention will be described with reference to the accompanying drawings.

Note that, reference signs, as in "symbol point 400A" and "symbol point 400B," may be used for describing elements of the same kind while distinguishing them from each other, and only common numbers of the reference signs, as in "symbol points 400," may be used for describing elements of the same kind without distinguishing them from each other in the below-mentioned embodiment.

A radio communication system according to an embodiment of the invention includes at least radio base station (hereinafter referred to as "base station") 10 illustrated in FIG. 1 and user terminal (hereinafter referred to as "terminal") 20 illustrated in FIG. 2. Terminal 20 is connected to radio base station 10. Radio base station 10 transmits a DownLink (DL) signal to terminal 20. The DL signal includes a DL data signal (for example, Physical Downlink Shared Channel (PDSCH)) and a DL control signal (for example, Physical Downlink Control Channel (PDCCH)) used for demodulating and decoding the DL data signal, for example.

<Radio Base Station 10>

Figure 1:
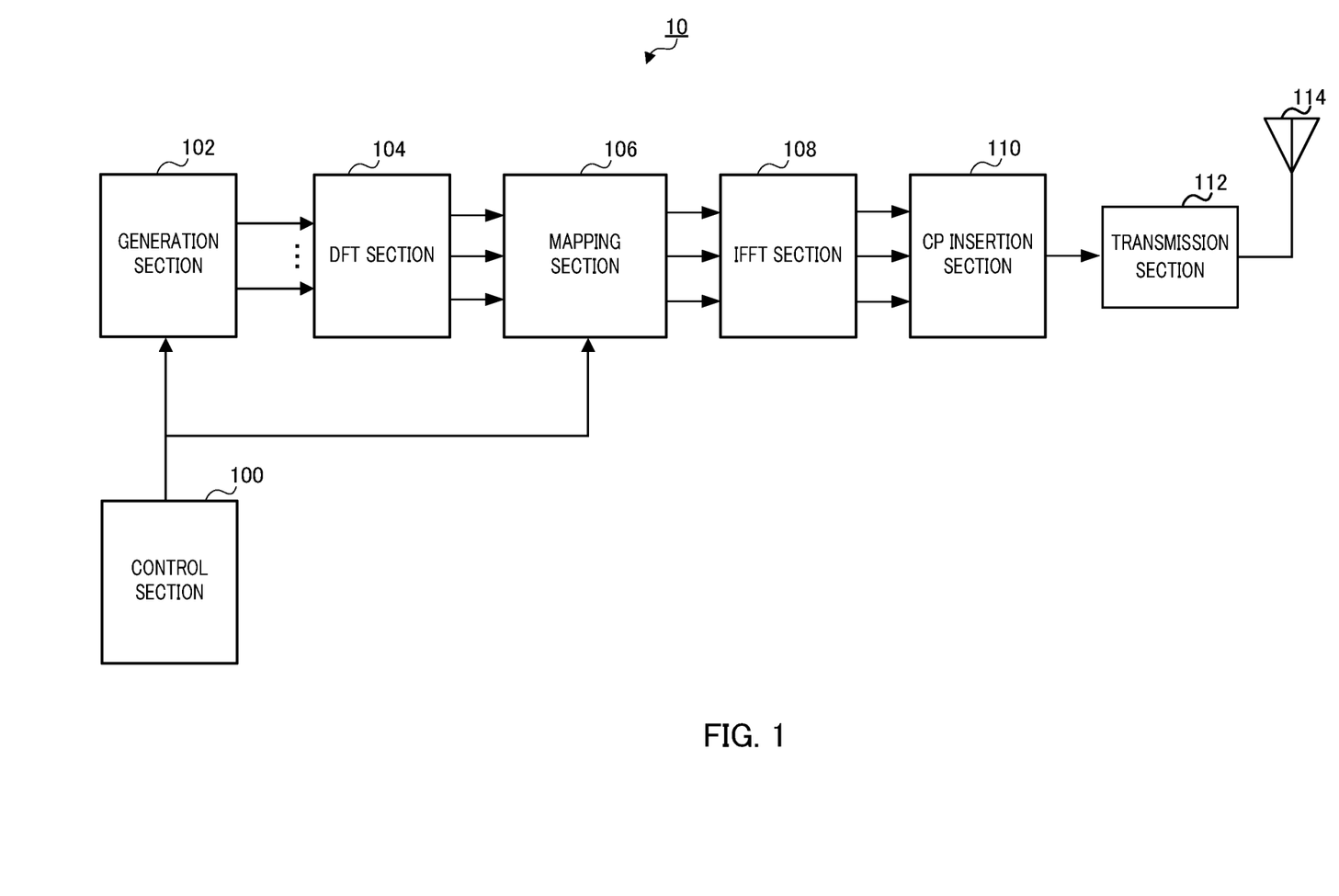
FIG. 1 illustrates an exemplary configuration of functional blocks of a radio base station according to an embodiment of the invention.

FIG. 1 illustrates an exemplary configuration of functional blocks of a radio base station according to an embodiment of the invention. Base station 10 illustrated in FIG. 1 includes control section 100, generation section 102, DFT section 104, mapping section 106, IFFT section 108, Cyclic Prefix (CP) insertion section 110, transmission section 112, and antenna 114. Note that a DFT-s-OFDM symbol is generated by DFT section 104, mapping section 106, IFFT section 108, and CP insertion section 110.

Control section 100 controls generation section 102 and mapping section 106 based on a constraining condition and the like shared with terminal 20. For example, control section 100 performs scheduling (resource assignment and the like) of DL signals for terminals 20 based on the constraining condition and the like, and controls generation section 102 and mapping section 106 based on the scheduling.

Base on the control by control section 100, generation section 102 assigns, in the time domain in a single-carrier radio resource, the DL signals to be transmitted to terminals 20, generates a time domain signal (first data), and outputs the generated time domain signal (first data) to DFT section 104. That is, generation section 102 time-division multiplexes the DL signals to be transmitted to a plurality of terminals 20 while the DL signals are the time domain signals before being spread by DFT section 104.

DFT section 104 performs the discrete Fourier transform on the time domain signals (first data) converted from serial to parallel form, and outputs resulting frequency domain signals to mapping section 106.

Based on the control from control section 100, mapping section 106 maps the frequency domain signals output from DFT section 104 to a plurality of subcarriers, maps zero to subcarriers other than the subcarriers to which the frequency domain signals are mapped, and outputs the mapped frequency domain signals to IFFT section 108.

IFFT section 108 performs the inverse fast Fourier transform on the frequency domain signals output from mapping section 102, and outputs resulting time domain signals (DFT-s-OFDM signals) to CP insertion section 110.

CP insertion section 110 inserts a CP to the time domain signals output from IFFT section 108, and outputs resulting signals to transmission section 112.

Transmission section 112 performs Radio Frequency (RF) processing, such as Digital-to-Analog (D/A) conversion, upconversion, amplification, and the like on the time domain signals (DL signals) output from CP insertion section 110, and transmits radio signals to terminals 20 via antenna 114.

<User Terminal 20>

Figure 2:
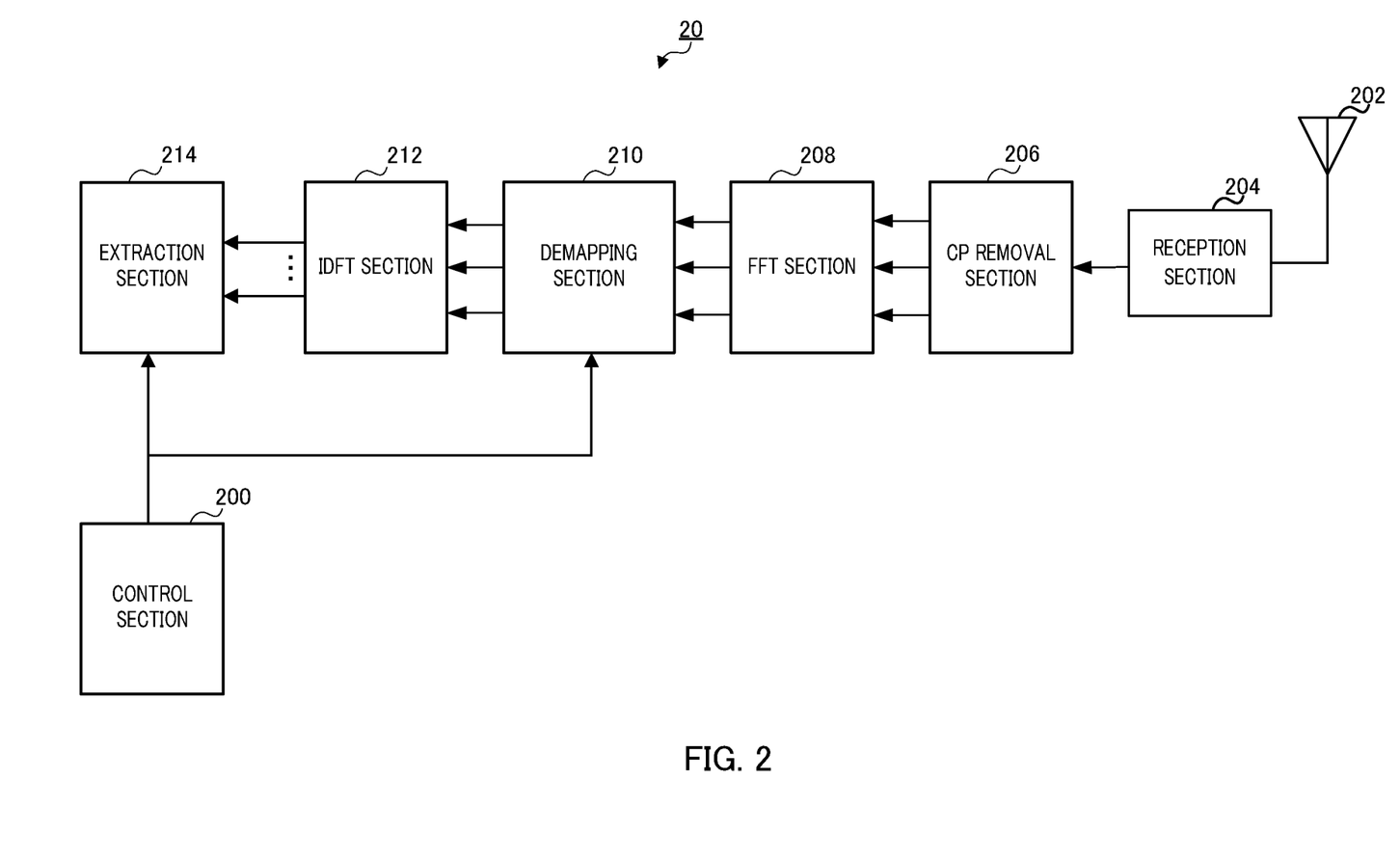
FIG. 2 illustrates an exemplary configuration of functional blocks of a user terminal according to an embodiment of the invention.

FIG. 2 illustrates an exemplary configuration of functional blocks of a user terminal according to an embodiment of the invention. User terminal 20 illustrated in FIG. 2 includes control section 200, antenna 202, reception section 204, CP removal section 206, FFT section 208, demapping section 210, IDFT section 212, and extraction section 214.

Note that, a DFT-s-OFDM symbol is extracted by CP removal section 206, FFT section 208, demapping section 210, and IDFT section 212.

Control section 200 controls demapping section 210 and extraction section 214 based on the constraining condition and the like shared with base station 10.

A radio signal received by antenna 202 is input to reception section 204. Reception section 204 performs RF processing, such as amplification, downconversion, Analog-to-Digital (A/D) conversion, and the like on the radio signal received by antenna 202, and outputs a baseband time domain signal (DL signal) to CP removal section 206.

CP removal section 206 removes a CP added to the time domain signal (DFT-s-OFDM signal) output from reception section 204, and outputs the time domain signal to FFT section 208.

FFT section 208 performs the fast Fourier transform on the time domain signal (DFT-s-OFDM signal) output from CP removal section 206, and outputs a resulting frequency domain signal to demapping section 210.

Based on the control by control section 200, demapping section 210 performs, on the signal output from FFT section 208, equalization processing corresponding to a signal waveform transmitted by radio base station 10, and outputs a signal subjected to the equalization processing to IDFT section 212.

IDFT section 212 performs the inverse discrete Fourier transform on the frequency domain signal output from demapping section 210, and obtains a time domain signal (first signal). IDFT section 212 outputs this time domain signal (first signal) to extraction section 214.

Extraction section 214 extracts a DL signal addressed to terminal 20 to which extraction section 214 belongs, from the time domain signal (first signal) and based on the control by control section 200. The details of processing performed by extraction section 214 will be described below.

<RBG Configuration>

Figure 3A:
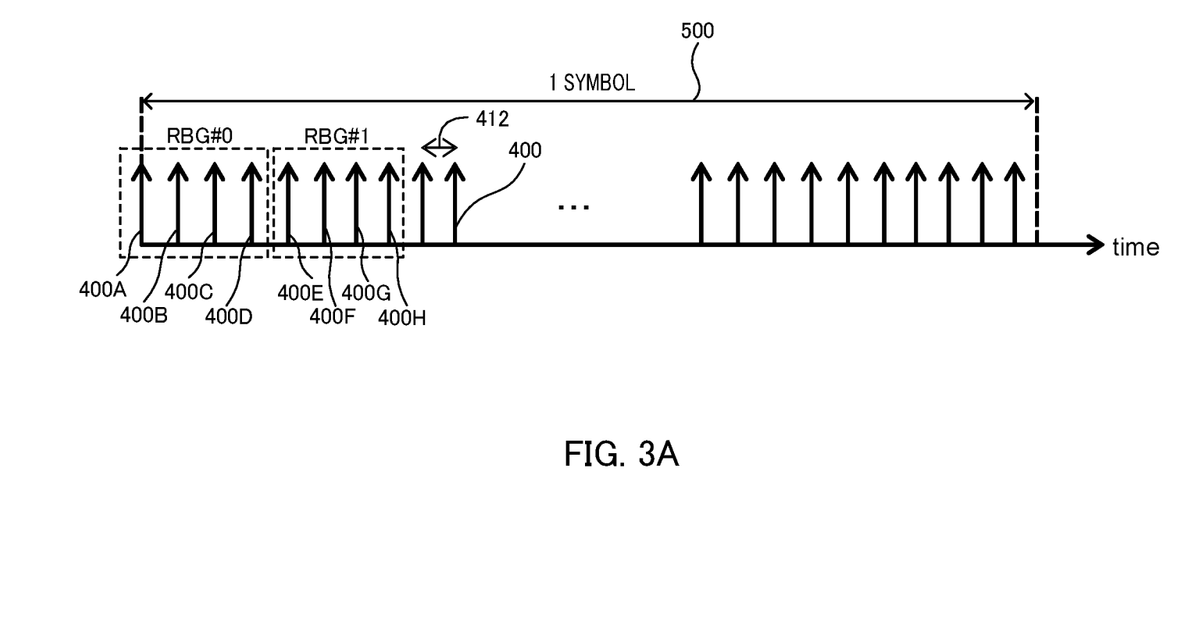
FIG. 3A illustrates an exemplary Resource Block Group (RBG) configuration according to the embodiment of the invention.

FIG. 3A illustrates an exemplary configuration of a Resource Block Group (RBG) according to the embodiment of the invention.

In FIG. 3A, the horizontal axis represents a time axis. Arrows 400 represent signal transmission points on which DL signals are transmitted on a single career. The signal transmission point may also be referred to as sample point 400. Alternatively, the signal transmission point may also be referred to as a subcarrier, tone, resource element, component, symbol, mini symbol, or sample. Note that, these terms of the signal transmission point are mere examples in every respect, and may also be referred to by other names. Interval 412 between sample points 400 is "1/system bandwidth," for example.

The spacing between the dotted lines as illustrated in FIG. 3A represents the length of one symbol (slot, mini slot) 500 in which a plurality of sample points are bundled. One subframe (or TTI) (not illustrated) is composed of a plurality of symbols 500.

Base station 10 assigns DL signals to sample points 400, and transmits the DL signals to terminals 20. In the embodiment of the present invention, assigning, to sample points 400, the DL signals addressed to terminals 20 is achieved in order to make it possible to transmit DL signals to a plurality of terminals in one TTI, respectively.

Accordingly, a Resource Block Group (RBG) composed of a predetermined number of sample points 400 is defined. The RBG is the minimum unit of the number of sample points 400 to be associated with one terminal 20. That is, at least one RBG is associated with one terminal 20.

The RBG is configured based on a predetermined constraining condition. This constraining condition is referred to as an RBG-configuration constraining condition. Terminal 20 shares the RBG-configuration constraining condition with base station 10, and thus, can identify an RBG associated with this terminal 20.

Hereinafter, the first RBG-configuration constraining condition—an RBG is composed of consecutive k sample points 400, where k is an integer equal to or greater than 1—is described with reference to FIG. 3A.

For example, in the case of k=4, generation section 102 of base station 10 configures RBG #0 with bundled 0th to 3rd consecutive sample points 400A, 400B, 400C, and 400D starting from the start of symbol 500, as illustrated in FIG. 3A. In the same manner, generation section 102 configures RBG #1 with bundled 4th to 7th sample points 400E, 400F, 400G, and 400H following the symbols in RBG #0. Note that, "RBG #0" means the RBG whose RBG number is "0" and "RBG #1" the RBG whose RBG number is "1." The same applies hereinafter.

Then, generation section 102 assigns, to sample points 400A, 400B, 400C, and 400D belonging to RBG #0, a DL signal to be transmitted to terminal 20 associated with RBG #0. In the same way, generation section 102 assigns, to sample points 400E, 400F, 400G, and 400H belonging to RBG #1, a DL signal to be transmitted to terminal 20 associated with RBG #1.

Extraction section 214 of terminal 20 extracts the DL signal addressed to this terminal 20 from sample points 400 contained in symbol 500 based on the RBG number assigned to this terminal 20.

For example, terminal 20 associated with RBG #0 extracts, from symbol 500 illustrated in FIG. 3A, the DL signal assigned to sample points 400A, 400B, 400C, and 400D belonging to RBG #0. Terminal 20 associated with RBG #1 extracts, from symbol 500 illustrated in FIG. 3A, the DL signal assigned to sample points 400E, 400F, 400G, and 400H belonging to RBG #1.

<Effect>

The above-mentioned configuration makes it possible for base station 10 to assign (multiplex), in the time domain, DL signals to be transmitted respectively to a plurality of terminals 20. In addition, each of terminals 20 can extract corresponding one of the DL signals respectively addressed to terminals 20, from among the DL signals multiplexed in the time domain.

Note that, the RBG-configuration constraining condition may be shared between base station 10 and terminal 20 by any method. For example, the RBG-configuration constraining condition may be shared between base station 10 and terminal 20, in advance or using a DL control signal or the like.

In addition, the information on number k of sample points 400 constituting an RBG may be shared between base station 10 and terminal 20 by any method. For example, such information may be shared between base station 10 and terminal 20, in advance or using a DL control signal or the like.

<Modification of RBG Configuration>

Figure 3B:
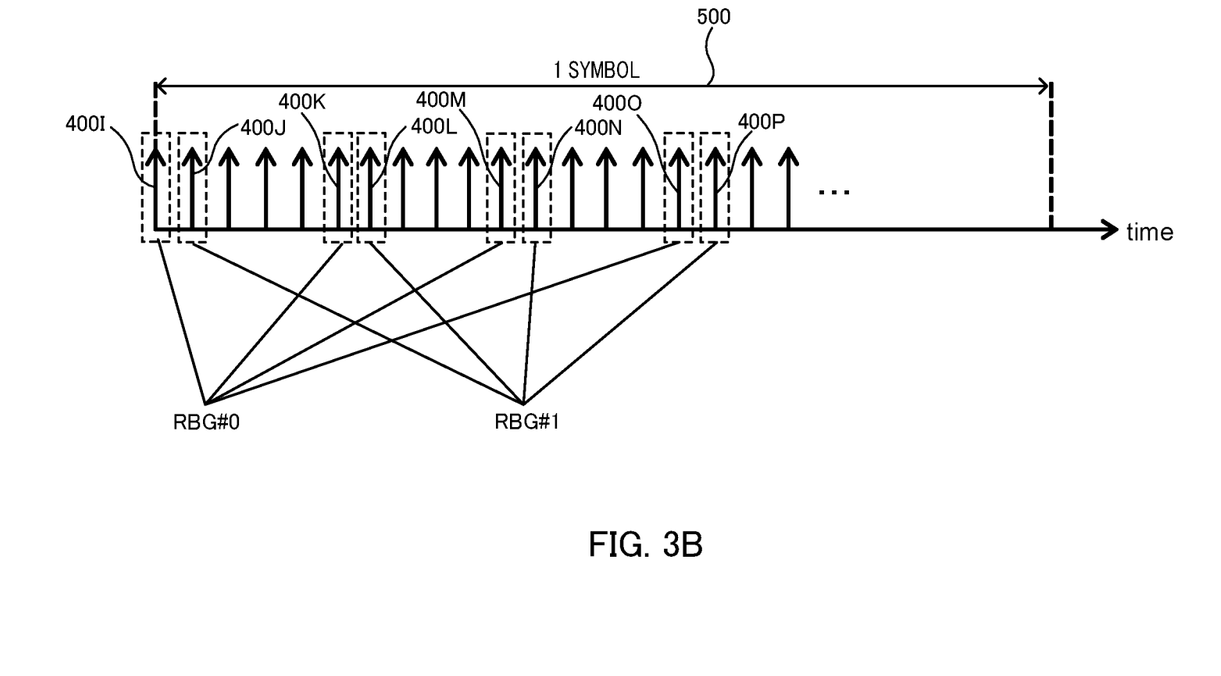
FIG. 3B illustrates a modification of the RBG configuration according to the embodiment of the invention.

FIG. 3B illustrates a modification of the RBG configuration according to the embodiment of the invention.

Hereinafter, the second RBG-configuration constraining condition—an RBG is composed of k discrete sample points distributed at intervals of m sample points, where m is an integer equal to or greater than 1—is described with reference to FIG. 3B.

For example, in the case of m=5 and k=4, generation section 102 of base station 10 configures RBG #0 with bundled 0th, 5th, 10th, and 15th sample points 400I, 400K, 400M, and 400O within symbol 500, as illustrated in FIG. 3B. In the same manner, generation section 102 configures RBG #1 with bundled 1st, 6th, 11th, and 16th sample points 400J, 400L, 400N, and 400P.

Then, generation section 102 assigns, to sample points 400I, 400K, 400M, and 400O belonging to RBG #0, a DL signal to be transmitted to terminal 20 associated with RBG #0. In the same way, generation section 102 assigns, to sample points 400J, 400L, 400N, and 400P belonging to RBG #1, a DL signal to be transmitted to terminal 20 associated with RBG #1.

Extraction section 214 of terminal 20 extracts the DL signal addressed to this terminal 20 from sample points 400 contained in one symbol based on the RBG number assigned to this terminal 20.

For example, terminal 20 to which RBG #0 is assigned extracts, from symbol 500 illustrated in FIG. 3B, the DL signal assigned to sample points 400I, 400K, 400M, and 400O belonging to RBG #0. Terminal 20 to which RBG #1 is assigned extracts, from symbol 500 illustrated in FIG. 3B, the DL signal assigned to sample points 400J, 400L, 400N, and 400P belonging to RBG #1.

As in the case illustrated in FIG. 3A, the information on the RBG-configuration constraining condition, the discrete intervals m, and number k of sample points 400 constituting an RBG may be shared between base station 10 and terminal 20 by any method. For example, such information may be shared between base station 10 and terminal 20, in advance or using a DL control signal or the like.

Note that, the above-mentioned first and second RBG-configuration constraining conditions are mere examples in every respects, and the RBG-configuration constraining condition is not limited to these examples.

In addition, the RBG-configuration constraining condition may be different depending on subframes or symbols. In this case, base station 10 may notify terminals 10 of the RBG-configuration constraining condition using the DL control signal and the like.

An example of the notification method is described below.

<Associating RBG with Terminal>

Figure 4:
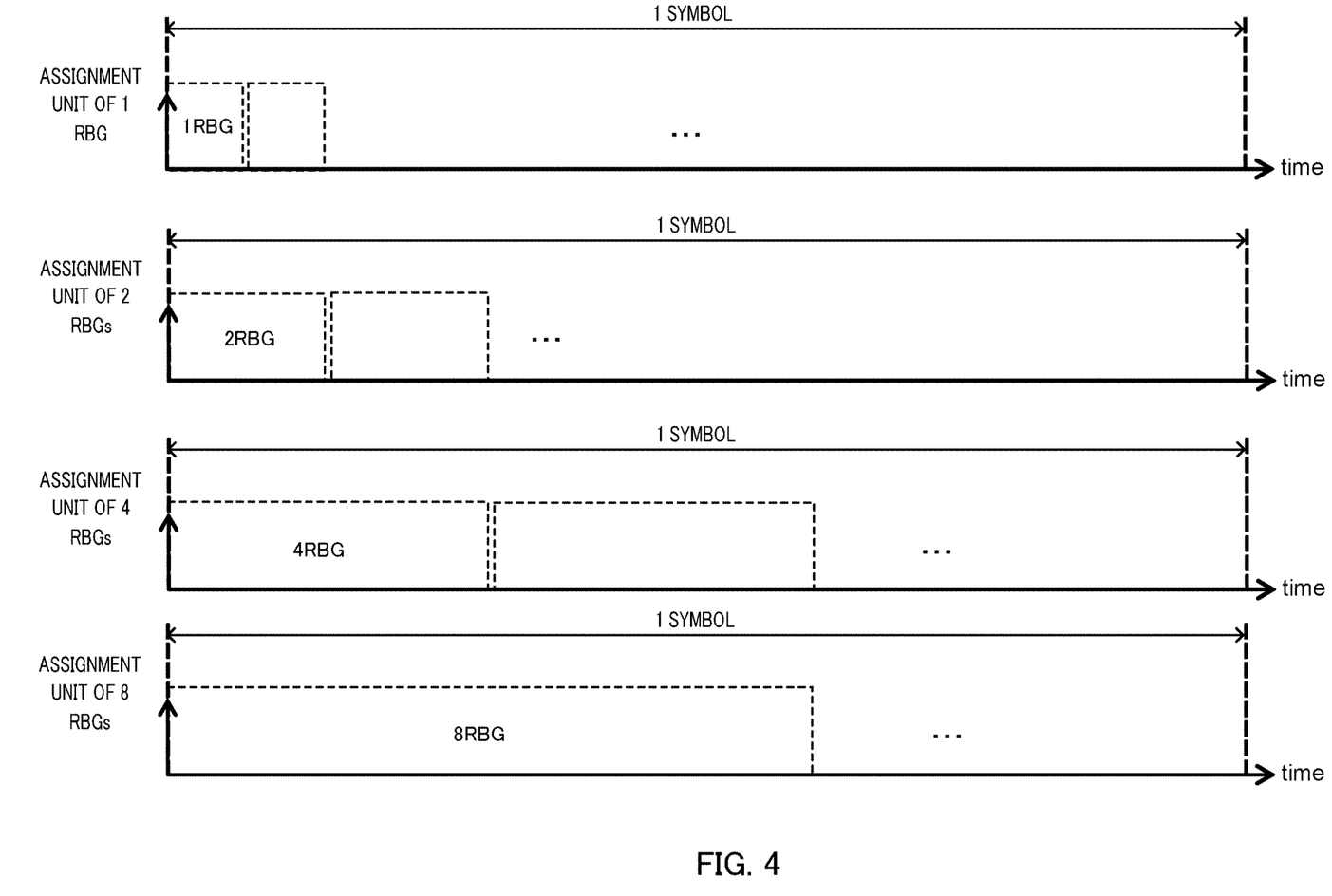
FIG. 4 illustrates an exemplary method for associating the RBG with a terminal according to the embodiment of the invention.

FIG. 4 illustrates an exemplary method for associating an RBG with a terminal according to the embodiment of the invention.

A predetermined constraining condition may be configured for association between an RBG and one terminal 20. This constraining condition is referred to as an RBG-association constraining condition.

Examples of the RBG-association constraining conditions include a configuration in which the number of RBGs (aggregation level) capable of being associated with one terminal 20 is set to a power of 2, such as 1 RBG, 2 RBGs, 4 RBGs, 8 RBGs, or the like, as illustrated in FIG. 4. That is, a "tree-based structure" is configured for the RBG-association constraining condition.

In this case, an assignable RBG is determined depending on aggregation levels. For example, when an aggregation level is "n" (n: 1, 2, 4, 8), n consecutive RBG(s) starting from an RBG having an RBG number corresponding to a multiple of "n" is assigned to a DL signal.

More specifically, when the "aggregation level" is "1," 1 consecutive RBG starting from RBG #0, #1, #2, or the like corresponding to any of the multiples of 1 is assigned to the DL signal (for example, RBG #0 is assigned to the DL signal).

When the "aggregation level" is "2," 2 consecutive RBGs starting from RBG #0, #2, #4, or the like corresponding to any of the multiples of 2 are assigned to the DL signal (for example, RBGs #0 and #1 are assigned to the DL signal).

When the "aggregation level" is "4," 4 consecutive RBGs starting from RBG #0, #4, #8, or the like corresponding to any of the multiples of 4 are assigned to the DL signal (for example, RBGs #0 to #3 are assigned to the DL signal).

When the "aggregation level" is "8," 8 consecutive RBGs starting from RBG #0, #8, #16, or the like corresponding to any of the multiples of 8 are assigned to the DL signal (for example, RBGs #0 to #7 are assigned to the DL signal).

However, the above-mentioned configuration in which the number of RBGs is a power of 2 is one example, and a configuration in which 3 RBGs are bundled may be possible, for example.

The above-mentioned configurations make it easier for generation section 102 of base station 10 to perform scheduling of RBGs. In addition, sharing the RBG-association constraining condition between base station 10 and terminal 20 makes it possible to reduce the amount of the information to be transmitted from base station 10 to terminal 20.

Note that, although the RBG is composed of consecutive sample points 400 in FIG. 4, the RBG may also be configured with discrete sample points 400 as illustrated in FIG. 3B.

<RBG Mapping to Plurality of Symbols>

Figure 5A:
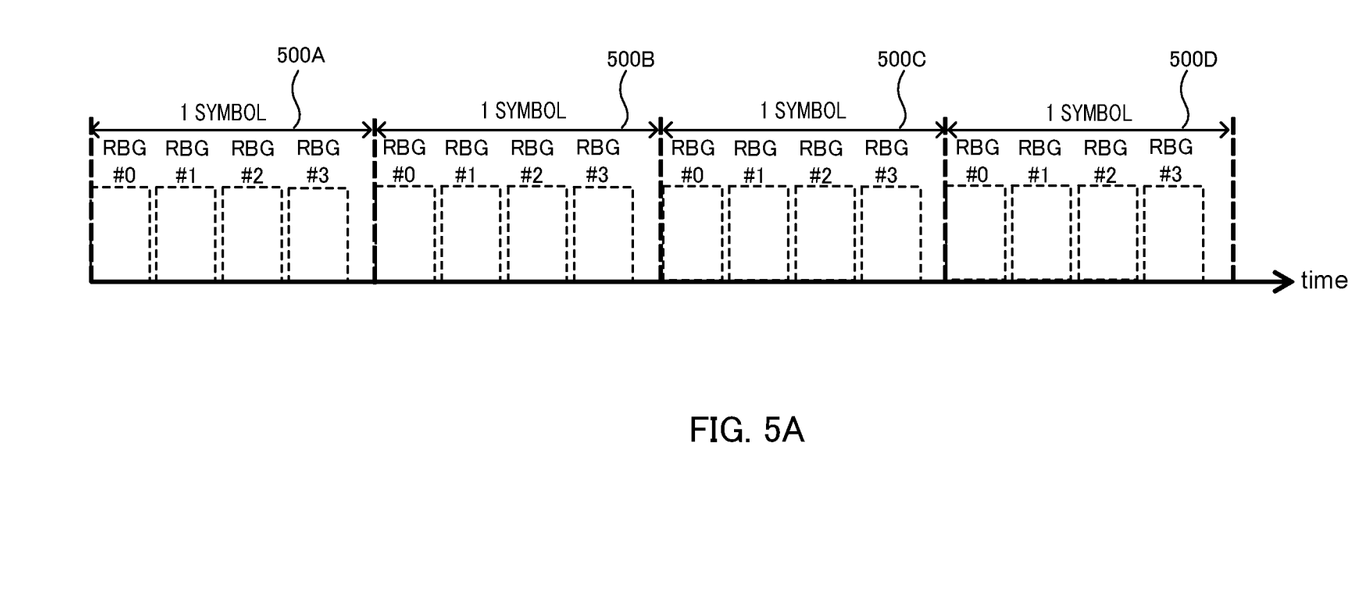
FIG. 5A illustrates an example of RBG mapping to a plurality of symbols according to the embodiment of the invention.

FIG. 5A illustrates an example of RBG mapping to a plurality of symbols according to the embodiment of the invention.

As illustrated in FIG. 5A, RBGs of the same number may be mapped to a plurality of symbols 500. In addition, the RBG mapping pattern to a plurality of symbols 500 may be constrained by a predetermined mapping pattern.

Hereinafter, a constraining condition that RBGs of the same number are mapped to each of symbols 500 in the same order is described with reference to FIG. 5A.

For example, generation section 102 of base station 10 maps RBGs #0, #1, #2, and #3 in this order to each of symbols 500A, 500B, 500C, and 500D, as illustrated in FIG. 5A.

Extraction section 214 of terminal 20 extracts, from each of symbols 500A, 500B, 500C, and 500D, a DL signal assigned to sample point 400 belonging to an RBG addressed to this terminal 20 based on an RBG number assigned to this terminal 20.

For example, terminal 20 with which RBG #0 is associated extracts, from symbols 500A, 500B, 500C, and 500D illustrated in FIG. 5A, DL signals assigned to sample points 400 belonging to RBGs #0. Terminal 20 with which RBG #1 is associated extracts, from symbols 500A, 500B, 500C, and 500D illustrated in FIG. 5A, DL signals assigned to sample points 400 belonging to RBGs #1.

The above-mentioned configuration makes it easier for generation section 102 of base station 10 to perform scheduling of RBGs in a plurality of symbols 500. In addition, sharing the constraining condition of RBG mapping between base station 10 and terminal 20 makes it possible to reduce the amount of the information to be transmitted from base station 10 to terminal 20.

Note that, although the RBG is composed of consecutive sample points 400 in FIG. 5A, the RBG may also be configured with discrete sample points 400 as illustrated in FIG. 3B.

<Modification of RBG Mapping to Plurality of Symbols>

Figure 5B:
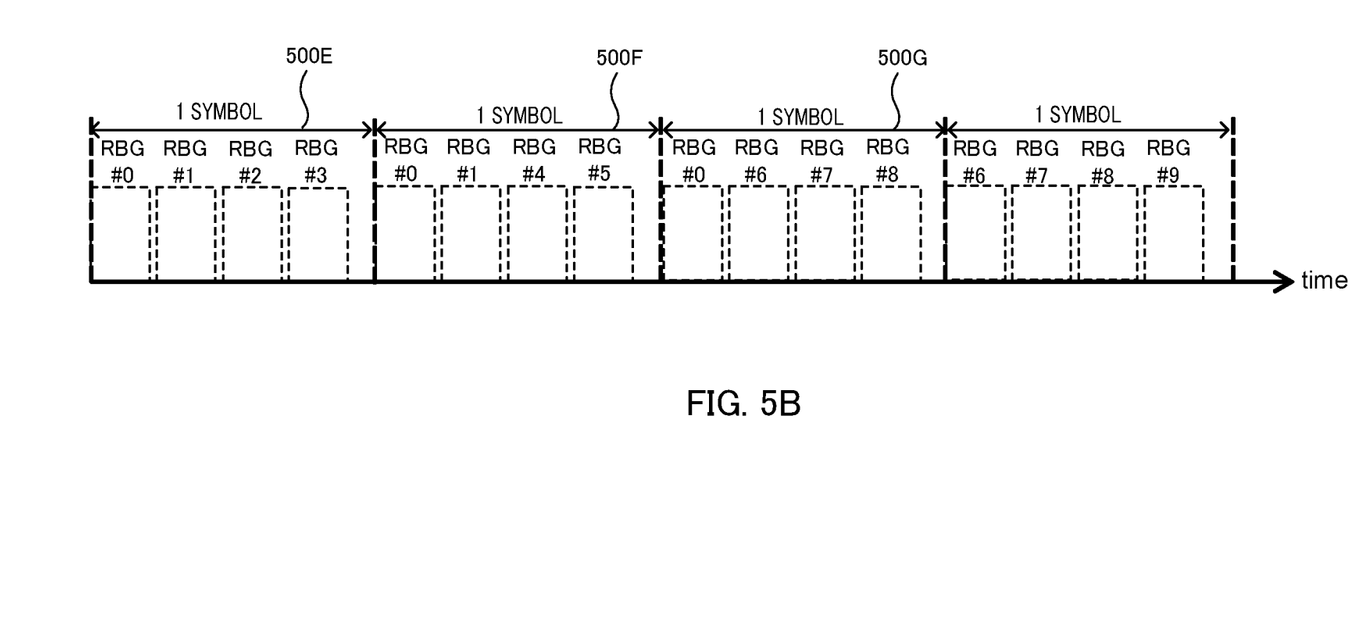
FIG. 5B illustrates a modification of RBG mapping to a plurality of symbols according to the embodiment of the invention.

FIG. 5B illustrates a modification of RBG mapping to a plurality of symbols according to the embodiment of the invention.

Although FIG. 5A shows the case where the RBGs of the same numbers are mapped in the same order in each of symbols 500, the RBG mapping pattern to each of symbols 500 is not limited to this case. For example, RBGs of different numbers may be mapped in an arbitrary order in symbols as illustrated in FIG. 5B.

For example, generation section 102 of base station 10 maps RBG #0 to symbols 500E, 500F, and 500G, and maps RBG #1 to symbols 500E and 500F, as illustrated in FIG. 5B.

The above-mentioned configuration allows generation section 102 of base station 10 a greater degree of freedom in scheduling of RBGs in a plurality of symbols 500. In addition, the number of RBG(s) to be associated with terminals 20 may be variable among terminals 20.

Note that, although the RBG is composed of consecutive sample points 400 in FIG. 5B, the RBG may also be configured with discrete sample points 400 as illustrated in FIG. 3B.

<Association between RBG and CCE>

Figure 6:
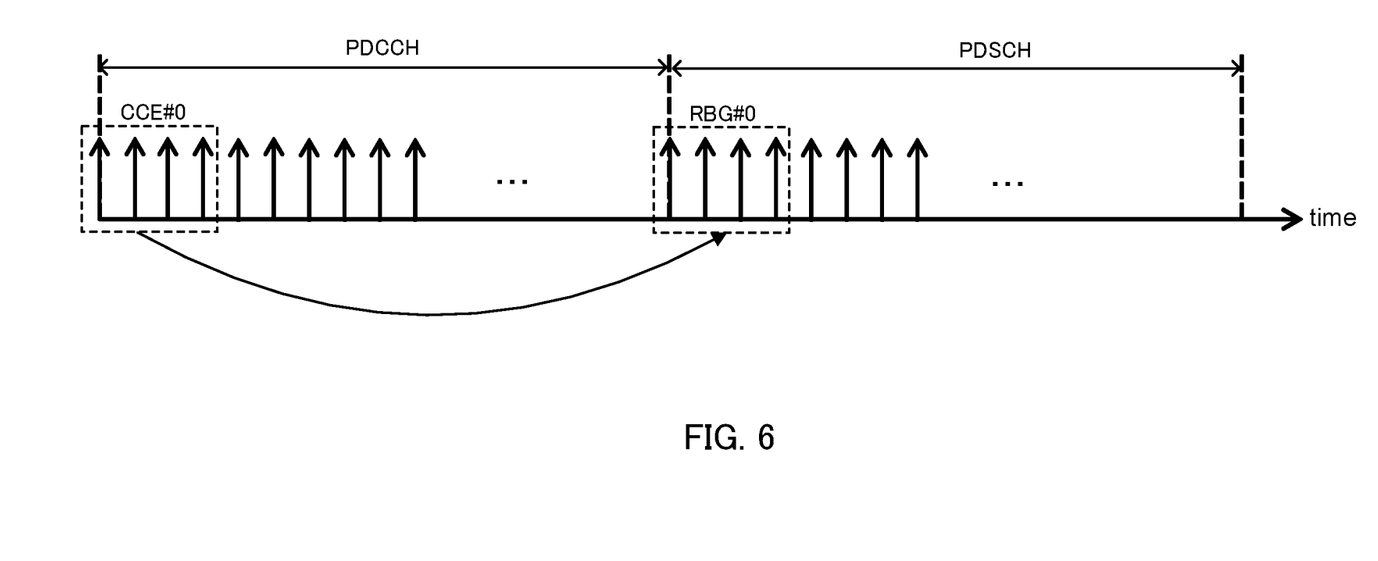
FIG. 6 illustrates an exemplary relationship between a Control Channel Element (CCE) and an RBG according to the embodiment of the invention.

FIG. 6 illustrates an exemplary relationship between a Control Channel Element (CCE) and an RBG according to the embodiment of the invention. Note that, the CCE may also be referred to as an RBG in a DL control signal.

As described above, DL signals to be transmitted to a plurality of terminals 20 are time-division multiplexed while the DL signals are the time domain signals before being spread by DFT section 104. This time-division multiplexing may be performed with respect not only to a DL data signal (PDSCH) but also to a DL control signal (PDCCH).

That is, multiplexing DL signals for a plurality of terminals 20 in symbols 500 is applicable to both of the DL control signal (PDCCH) and DL data signal (PDSCH). When such multiplexing is applied to the DL control signal, a CCE index may serve as the minimum unit of the number of sample points 400 to be associated with one terminal 20.

As a constraining condition, Downlink Control Information (DCI) may be linked with a CCE index and the CCE index may be linked with an RBG number. This configuration, for example, makes it possible for terminal 20 to identify CCE #0 linked with the DCI addressed to this terminal 20, and to extract the DL data signal assigned to RBG #0 linked with that identified CCE #0.

Alternatively or additionally, as a constraining condition, a CCE index may be linked with a modulation scheme. In a case where CCE #0 is linked with the modulation scheme "QPSK," this configuration, for example, makes it possible for terminal 20 to identify CCE #0 linked with a DCI addressed to this terminal 20, and to demodulate the DL data signal using the modulation scheme "QPSK" linked with that identified CCE #0.

Alternatively or additionally, as a constraining condition, Modulation and Coding Scheme (MCS) may be limited depending on CCE indices. Alternatively or additionally, as a constraining condition, the number of RBG(s) may be limited depending on CCE indices.

The above-mentioned configurations make it possible to reduce the amount of information to be indicated to terminal 20 in the DCI. That is, the number of bits of DCI can be reduced.

<Notification Method of Predetermined Pattern>

Next, the above-mentioned method for notifying terminal 20 of a constraining-condition pattern from base station 10 is described.

Base station 10 may notify terminal 20 of the constraining-condition pattern explicitly or implicitly.

For example, base station 10 may notify terminal 20 of the constraining-condition pattern by Radio Resource Control (RRC) signaling, Medium Access Control (MAC) signaling, physical layer (PHY) signaling, or the like when base station 10 notifies terminal 20 of the constraining-condition pattern explicitly. By way of example, base station 10 may notify terminal 20 of the constraining-condition pattern using a Master Information Block (MIB), System Information Block (SIB), RACH message 2 (which may also be referred to as Random Access Response: RAR), Paging information, RRC connection information, S1 connection configuration, or the like.

Base station 10 may also notify terminal 20 of the constraining-condition pattern (constraining-condition pattern ID) using Downlink Control Information (DCI).

In addition, base station 10 and terminal 20 may, for example, associate a configuration and the like of a Synchronization Signal (SS), PBCH, SIB, or RACH with the constraining-condition pattern such that the configuration of SS or the like and the constraining-condition pattern have a one-to-one correspondence, when base station 10 notifies terminal 20 of the constraining-condition pattern implicitly. For example, when a plurality of patterns of configuration are specified for each of SS, PBCH, SIB, and RACH, the plurality of patterns may be grouped to be associated with mutually different Configuration IDs. In grouping, predetermined information suitable for use in a communication environment in which one of the plurality of patterns (for example, one of the plurality of patterns in which subcarrier spacings of SS are different from each other) is used may be associated with the one of the plurality of patterns.

Base station 10 transmits, to terminal 20, a signal of a group associated with the constraining-condition pattern configured for terminal 20. In this case, terminal 20 identifies, as a constraining-condition pattern configured for this terminal 20, the constraining-condition pattern (pattern ID) associated with the group to which the signal transmitted by base station 10 belongs. With this configuration, implicit notification of a predetermined pattern is achieved using the existing signals, so that no new signaling is necessary for notification of the predetermined pattern.

Note that, base station 10 may notify terminal 20 of the predetermined pattern periodically or dynamically.

The embodiments of the invention have been described above.

(Hardware Configuration)

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 7:
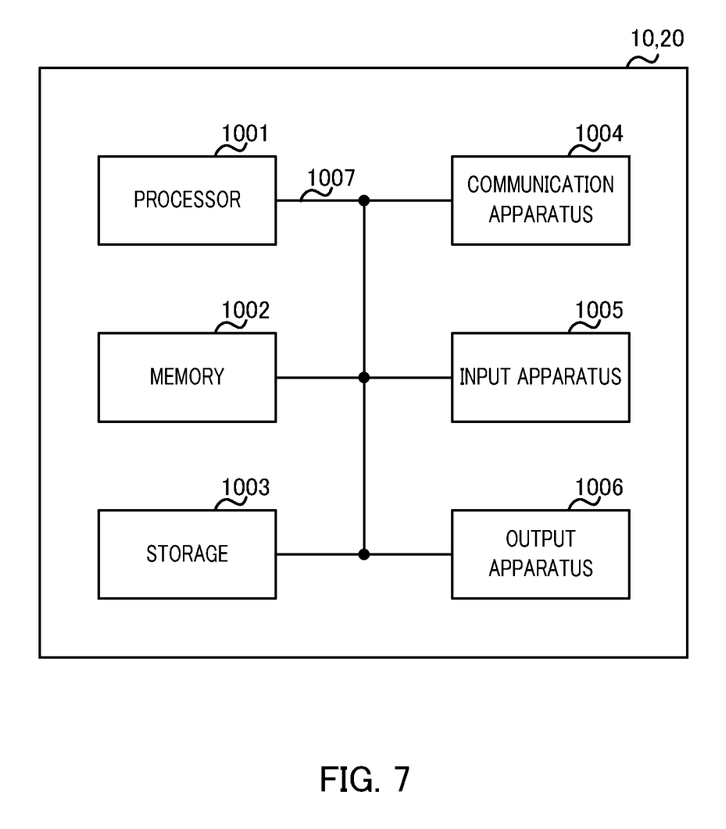
FIG. 7 illustrates an exemplary hardware configuration of the radio base station and the user terminal according to the present invention.

For example, the radio base station, the user terminal, and the like according to an embodiment of the present invention may function as a computer that executes processing of a radio communication method of the present invention. FIG. 7 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control sections 100 and 200, generation section 102, DFT section 104, mapping section 106, IFFT section 108, CP insertion section 110, extraction section 214, IDFT section 212, demapping section 210, CP removal section 206, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, control section 100 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission section 112, antennas 114 and 202, reception section 204, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

(Notification and Signaling of Information)

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

(Adaptive System)

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

(Operation of Base Station)

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

(Direction of Input and Output)

The information, the signals, and the like can be output from a higher layer (or a lower layer) to a lower layer (or a higher layer). The information, the signals, and the like may be input and output through a plurality of network nodes.

(Handling of Input and Output Information and the like)

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

(Information and Signals)

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

("System" and "Network")

The terms "system" and "network" used in the present specification can be interchangeably used.

(Names of Parameters and Channels)

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

(Base Station)

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

(Terminal)

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

(Meaning and Interpretation of Terms)

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. The correction RS may be called a TRS (Tracking RS), a PC-RS (Phase Compensation RS), a PTRS (Phase Tracking RS), or an additional RS. The demodulation RS and the correction RS may be called by other corresponding names, respectively. The demodulation RS and the correction RS may be specified by the same name (for example, demodulation RS).

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, and the symbol indicate time units in transmitting signals. The radio frame, the subframe, the slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, or one slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

(Variations and the like of Aspects)

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

The present patent application claims the benefit of priority based on Japanese Patent Application No. 2017-019122 filed on Feb. 3, 2017, and the entire content of Japanese Patent Application No. 2017-019122 is hereby incorporated by reference.

INDUSTRIAL APPLICABILITY

An aspect of the present invention is useful for a mobile communication system.

REFERENCE SIGNS LIST

10 Radio Base Station
20 User Terminal
100 Control Section
102 Generation Section
104 DFT Section
106 Mapping Section
108 IFFT Section
110 CP Insertion Section
112 Transmission Section
114 Antenna
200 Control Section
202 Antenna
204 Reception Section
206 CP Removal Section
208 FFT Section
210 Demapping Section
212 IDFT Section
214 Extraction Section

The invention claimed is:

1. A terminal comprising:
a receiver configured to receive a downlink signal within a symbol duration in a single carrier; and
a processor configured to extract the downlink signal assigned to at least one of a plurality of resources within the symbol duration in a time domain,
wherein the processor extracts the downlink signal based on a definition of a resource block group (RBG) within the symbol duration and the RBG comprising the at least one of a plurality of resources in the time domain and being associated with the terminal, and
wherein the processor configures the RBG based on an RBG-configuration constraining condition, the RBG-configuration constraining condition being dependent on the symbol duration.

2. The terminal according to claim 1, wherein the resources belonging to the resource block group are consecutive in a time domain.

3. The terminal according to claim 1, wherein the resources belonging to the resource block group are discrete in a time domain.

4. The terminal according to claim 1, wherein a predetermined number of resource block groups are associated with the terminal.

5. The terminal according to claim 1, wherein the resource block group associated with the terminal is mapped to a plurality of symbols.

6. The terminal according to claim 1, wherein
the downlink signal includes at least one of a downlink control signal and a downlink data signal, and
identification information for a resource block group related to the downlink control signal is linked with identification information for a resource block group related to the downlink data signal.

7. A radio communication method comprising:
receiving a downlink signal within a symbol duration in a single carrier; and
extracting the downlink signal assigned to at least one of a plurality of resources within the symbol duration in a time domain,
wherein the downlink signal is extracted based on a definition of a resource block group (RBG) within the symbol duration and the RBG comprising the at least one of a plurality of resources in the time domain and being associated with a terminal, and
wherein the method further includes configuring the RBG based on an RBG-configuration constraining condition, the RBG-configuration constraining condition being dependent on the symbol duration.

* * * * *